United States Patent
Taniguchi

(10) Patent No.: US 7,337,366 B2
(45) Date of Patent: Feb. 26, 2008

(54) MICROCOMPUTER, A METHOD FOR PROTECTING MEMORY AND A METHOD FOR PERFORMING DEBUGGING

(75) Inventor: Masayoshi Taniguchi, Shiga-ken (JP)

(73) Assignee: International Business Machines Corporation, Armonk, NY (US)

( * ) Notice: Subject to any disclaimer, the term of this patent is extended or adjusted under 35 U.S.C. 154(b) by 419 days.

(21) Appl. No.: 10/905,139

(22) Filed: Dec. 17, 2004

(65) Prior Publication Data

US 2005/0138481 A1    Jun. 23, 2005

(30) Foreign Application Priority Data

Dec. 19, 2003   (JP) .............................. 2003-421942

(51) Int. Cl.
   *G06F 11/00*   (2006.01)
(52) U.S. Cl. .......................................... 714/39; 714/54
(58) Field of Classification Search .................. 714/39, 714/5, 9, 53, 54, 702, 763; 711/100
   See application file for complete search history.

(56) References Cited

U.S. PATENT DOCUMENTS

| 6,530,047 | B1 * | 3/2003 | Edwards et al. ............ 714/724 |
| 6,557,119 | B1 * | 4/2003 | Edwards et al. ............ 714/38 |
| 7,114,024 | B2 * | 9/2006 | Herbst ......................... 711/100 |
| 2003/0217306 | A1 * | 11/2003 | Harthcock et al. ............ 714/30 |
| 2006/0129747 | A1 * | 6/2006 | Weber et al. ................ 711/100 |

FOREIGN PATENT DOCUMENTS

JP    2001-147831    5/2001

\* cited by examiner

*Primary Examiner*—Dieu-Minh Le
(74) *Attorney, Agent, or Firm*—Todd M. C. Li

(57) ABSTRACT

A microcomputer, a method for protecting memory and a method for performing debugging is provided including a TAP controller and instruction decoder for monitoring an external input for a processor, internal registers and comparators for determining whether or not the destination address of an access by the processor to ROM and SRAM is within a predetermined protected area, and internal registers and multiplexers as access control means. If a control instruction for the processor has been detected and an execution of an access from the processor to the protected area has been detected, the destination address of the access is replaced with addresses of a ROM and SRAM of an additional circuitry block that have been prepared by developers.

2 Claims, 6 Drawing Sheets

MICROCOMPUTER, A METHOD FOR PROTECTING MEMORY AND A METHOD FOR PERFORMING DEBUGGING

FIELD OF THE INVENTION

The present invention relates to protection of memory on SoC (System on Chip), and more specifically to a method and apparatus for protecting memory from being accessed, for example in debugging.

BACKGROUND OF ART

SoC is a microcomputer that integrates main functions of a computer including that of a processor, memory, or a peripheral device and equips it on one chip. SoC dramatically reduces the area required for implementation and remarkably reduces power consumption compared with other systems made up of a plurality of chips with equivalent functions. That is why SoC is used in a built-in appliance and the like.

In SoC, usually a processor as well as a read-only memory (ROM) and a random access memory (RAM) containing data can be incorporated on the same chip. This makes it difficult to directly access the incorporated ROM and RAM from outside (for example, to connect with a data bus of the ROM and RAM with a logic analyzer and electrically read in data). This is good in terms of security.

When SoC is subjected to a test such as debugging, the SoC cannot be checked by touching a probe on a terminal like in the case of an element on a board. Thus, a test, called Boundary Scan Test (BST), for checking the behavior of a chip by entering a test code from outside is broadly adopted (for example, see Published Unexamined Patent Application JP2001 147831A2).

A standard method of BST is the IEEE 1149.1 standard, known as JTAG. SoC corresponding to JTAG includes a JTAG port used for inputting/outputting and controlling test data, or an interface called TAP (Test Access Port) and a TAP controller in addition to a circuit serving a primary function of SoC in order to facilitate debugging of a chip and development of software. SoC corresponding to JTAG is designed to control a processor through a JTAG port and cause the processor to execute any instruction via the JTAG port. For example, PowerPC™ developed by International Business Machines Corporation (IBM®) in the United States can control a processor by connecting a debugger, developed by IBM, called RISCWatch™ (a debug tool) to a JTAG port of the processor.

As mentioned above, SoC is generally provided with a port and a controller for performing a boundary scan test. With a debug function provided by the port and controller, SoC can be invaded and have its memory accessed, allowing the content to be read.

In other words, with a debugger, such as the aforementioned RISCWatch™, contents of an inside register of SoC can be freely read in or written. With this function, data stored in memory can be read in and the content can be saved in an inside register. The content of the register further can be freely retrieved outside the SoC via a TDO (Test Data Output) terminal of JTAG. In this manner, data can be freely read from memory area that is forbidden to be accessed by MMU (Memory Management Unit) or the like (hereinafter referred to as a protected area).

Means for forbidding invasion of SoC with a debugger like those described above include a method for not connecting (not wiring) JTAG to a processor.

If JTAG is not connected to a processor, a debugger cannot be connected to the processor, which is sufficient in terms of data protection. However, this impedes debugging of a chip or development of software and requires a chip for debugging other than the product to be developed, therefore increases the cost.

SoC can be designed to allow memory to be accessed only by a specific procedure to make it difficult to access the memory. However, this method is not sufficient protection, because once the procedure is broken, it cannot prevent memory from being accessed.

Thus there is a need to provide a system of SoC and a method for controlling thereof for solving the abovementioned problems, and assuredly prevent a protected area of memory from being accessed when SoC is invaded, and also for allowing debugging in a conventional boundary scan test.

SUMMARY OF THE INVENTION

It is an object of the present inventio to provide a system of SoC and a method for controlling thereof for solving the abovementioned problems, and assuredly prevent a protected area of memory from being accessed when SoC is invaded, and also for allowing debugging in a conventional boundary scan test.

The present invention to achieve the above object is implemented as SoC configured as below. The SoC includes a processor, memory, first monitoring means for monitoring an external input for the processor, second monitoring means for monitoring whether or not the destination address of an access by the processor to the memory is within a predetermined protected area in the memory, and access control means for, if the first monitoring means has detected a control instruction to the processor and the second monitoring means has detected that an access from the processor to the memory has been conducted that is addressed to an address within the protected area, replacing the destination address of the access with an address outside the protected area.

More specifically, the first monitoring means can be a configuration including a port controller for obtaining an input from a port provided for debugging a microcomputer, and an instruction decoder for determining a type of the input obtained by the port controller.

The second monitoring means can be a configuration including a storage device storing an address of a protected area in the memory, and a comparator for comparing a destination address of an access by the processor and an address stored in the storage device.

The access control means can be a configuration including a storage device storing an address to replace, and a multiplexer for inputting a destination address of an access by the processor and an address stored in the storage device and for outputting one of the addresses according to a result of detection by the first monitoring means and the second monitoring means.

The present invention can be a configuration further including an external storage device having the same storage content as the memory for the above SoC. In this case, the access control means can replace the destination address of an access by the processor with an address corresponding to the protected area in the external storage device.

Another present invention to achieve the above object is implemented as SoC configured as below. The SoC includes a processor, first memory, second memory having the same storage content as the first memory, monitoring means for monitoring an external input for the processor, and access control means for, if the monitoring means has detected a control instruction to the processor, compulsorily switching an access from the processor to the first memory to an access to the second memory.

More preferably, the first memory is provided with a protected area forbidden to be accessed by the processor, and the access control means replaces the destination address of an access with an address corresponding to the protected area in the second memory, if said access control means has detected a control instruction to the processor and an access from the processor has been conducted that is addressed to an address within the protected area of the first memory.

In another aspect of the present invention to achieve the above object is implemented as SoC described below, implementing at least a processor and memory on a single integrated circuit. The SoC includes a debug port for debugging, for example, by way of a predetermined debugger, and an external bus for connecting an external storage device that has the same storage content as the memory, wherein when the external storage device is connected to the external bus to allow an access from the processor to the external storage device, a control instruction to the processor that is input via the debug port can be executed.

The present invention is also implemented as a method for protecting memory in a microcomputer that implements at least a processor and memory. This method for protecting includes the steps of accepting an external input of a control instruction by the processor and performing an access by the processor to the memory in accordance with the control instruction, and if the destination address of the access by the processor to the memory is within a predetermined protected area in said memory, replacing the destination address of the access with an address outside the protected area and executing the access.

The present invention is also implemented as a method for performing debugging in a microcomputer as described below that implements at least a processor and memory in the manner. This method for performing debugging includes the steps of connecting an external storage device that has the same storage content as the memory to the microcomputer, inputting a control instruction for accessing the memory for debugging for the processor, and the microcomputer switching an access to the memory to an access to the external storage device and executing the access.

According to the present invention configured as mentioned above, a protected area of memory can be protected without fail, even if the SoC is invaded from outside, by causing a processor to recognize that memory is accessed on the basis of a control instruction from outside and switches the destination of the access. The object of accessing memory is achieved by implementing an external storage device alternating memory on SoC. Thus, debugging by a conventional boundary scan test can be executed with no problem.

BRIEF DESCRIPTION OF THE DRAWINGS

The invention will be better understood from the following detailed description with reference to the drawings, in which.

DETAILED DESCRIPTION OF THE PREFERRED EMBODIMENTS

Next, the most preferable embodiment to implement the present invention (hereinafter referred to as embodiment) will be described in detail with reference to accompanying drawings.

Figure 1:
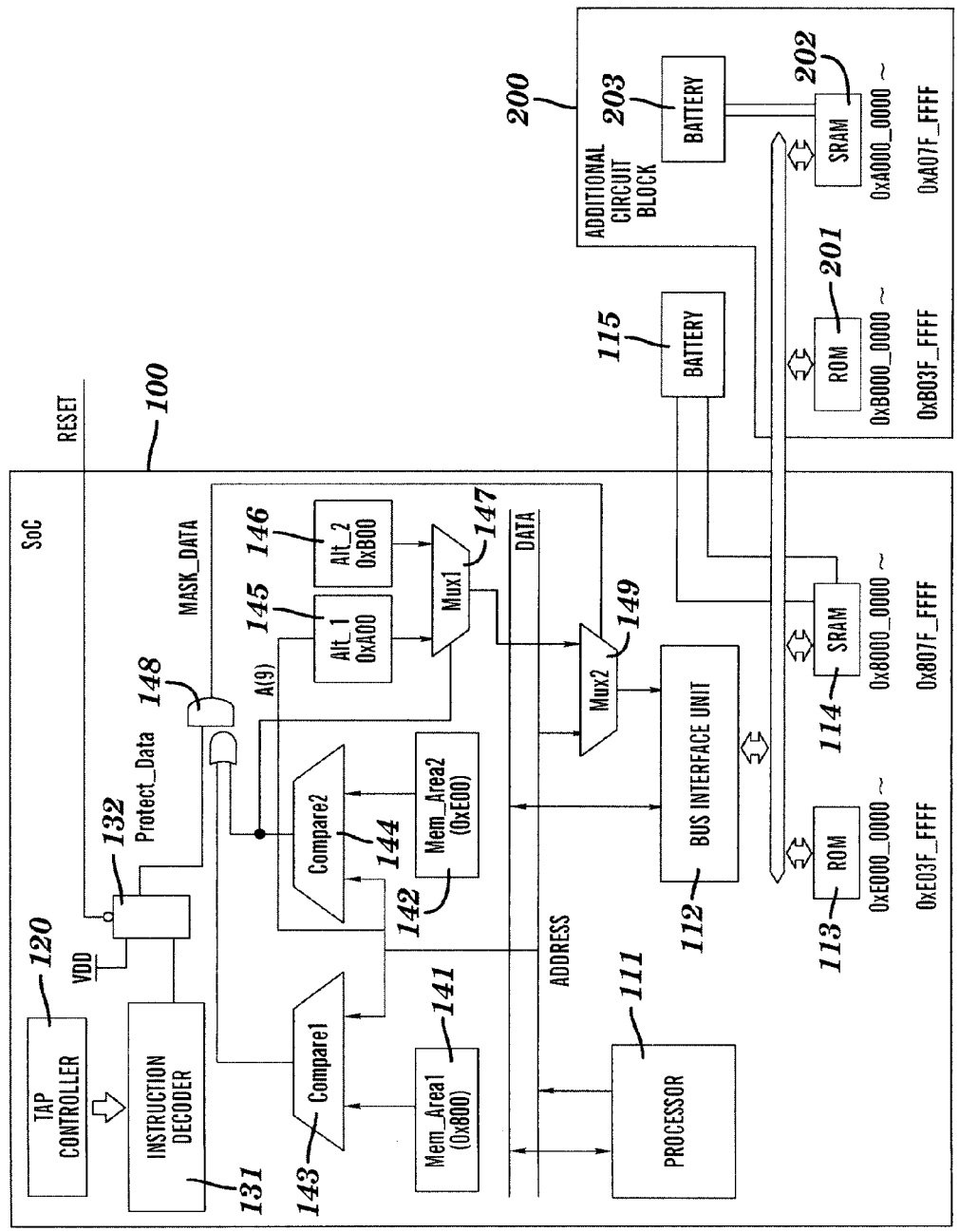
FIG. 1 is a drawing illustrating a configuration of SoC (System on Chip) provided with a protection mechanism according to the embodiment.

FIG. 1 is a drawing illustrating a configuration of SoC (System on Chip) provided with the protection mechanism according to the embodiment.

As shown in FIG. 1, SoC 100 according to the embodiment includes processor 111, bus interface unit 112, ROM 113, SRAM (static random access memory) 114. SoC 100 also includes TAP controller 120, instruction decoder 131, and protect register 132 as monitoring means of an external input for processor 111; inside registers 141 and 142, and Compares 143 and 144 as monitoring means of an access from processor 111 to memory (ROM 113 and SRAM 114); and inside registers 145 and 146, Multiplexers 147 and 149, and two input adder (AND) 148 as access control means for controlling an access from processor 111 to memory. SRAM 114 is backed up with battery 115.

In FIG. 1, processor 111 is connected to bus interface unit 112 via an address bus and a data bus, and accesses memory (memory element) including ROM 113 and SRAM 114. Compares 143 and 144 are connected to an address bus and can obtain a destination address if processor 111 accesses memory. Bus interface unit 112 is connected to an address bus via Multiplexer 149 and connected to ROM 113 and SRAM 114 via an external bus.

In the embodiment, as mentioned later, when SoC 100 is to be debugged, additional circuit block 200 of an external storage device implemented on SoC 100 is prepared. As shown in FIG. 1, additional circuit block 200 is provided with ROM 201, SRAM 202, and battery 203 for backing up SRAM 202. ROM 201 stores the same content as in ROM 113 of SoC 100, while SRAM 202 stores the same content as in SRAM 114 of SoC 100.

When additional circuit block 200 is implemented on SoC 100, ROM 201 and SRAM 202 are connected to bus interface unit 112 via an external bus as ROM 113 and SRAM 114 are, allowing an access from processor 111.

In order to protect data on memory (ROM 113 and SRAM 114) without affecting a debugging function by a boundary scan test on SoC, the embodiment realizes the following features listed below.

1. A processor can access all the memory areas in a general operation.

2. The embodiment has a function of detecting that a debugger is connected to a JTAG port and controls the processor.

3. The embodiment has means for forbidding an access to a memory area to be protected in memory, when a control on the processor by the debugger is detected.

4. The embodiment has means for realizing debugging and developing software, even if an access to a memory area to be protected within memory is forbidden.

Figure 2:
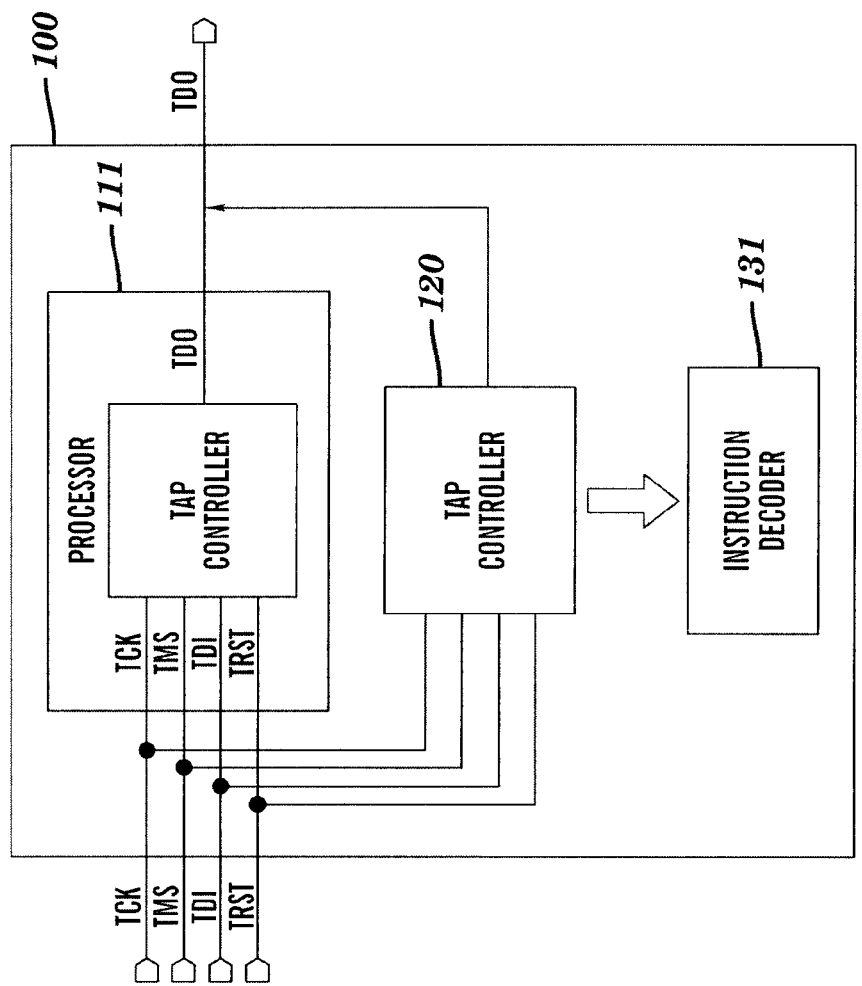
FIG. 2 is a drawing illustrating relationship between TAP controller and processor in SoC according to the embodiment.

FIG. 2 is a drawing illustrating relationship between TAP controller 120 and processor 111 in SoC 100.

A TAP controller for JTAG is also included in processor 111. A state machine of this TAP controller complies with JTAG and performs the same operation as that of external (on SoC 100) TAP controller 120. Usually, processor 111 is often implemented as a hard macro in consideration of improvement of performance and IP (Intellectual Property) protection and a signal in processor 111 cannot be directly manipulated. Therefore, a state of a TAP controller in processor 111 cannot be known from outside, and can only be inferred from the state of TAP controller 120 on SoC 100.

An instruction that can be provided for TAP controller 120 of JTAG can be divided into a public instruction and a private instruction. The private instruction is used for controlling processor 111 and performing Instruction. This private instruction code is determined when TAP controller 120 is designed. Therefore, whether an instruction for controlling processor 111 is input or not can be checked by monitoring an instruction code input to TAP controller 120. In the example shown in FIG. 2, whether a debugging instruction for controlling processor 111 is issued at instruction decoder 131 can be checked. SoC without JTAG function can also easily recognize the state of an access for a debugger by including a state machine for JTAG in SoC.

Figure 3:
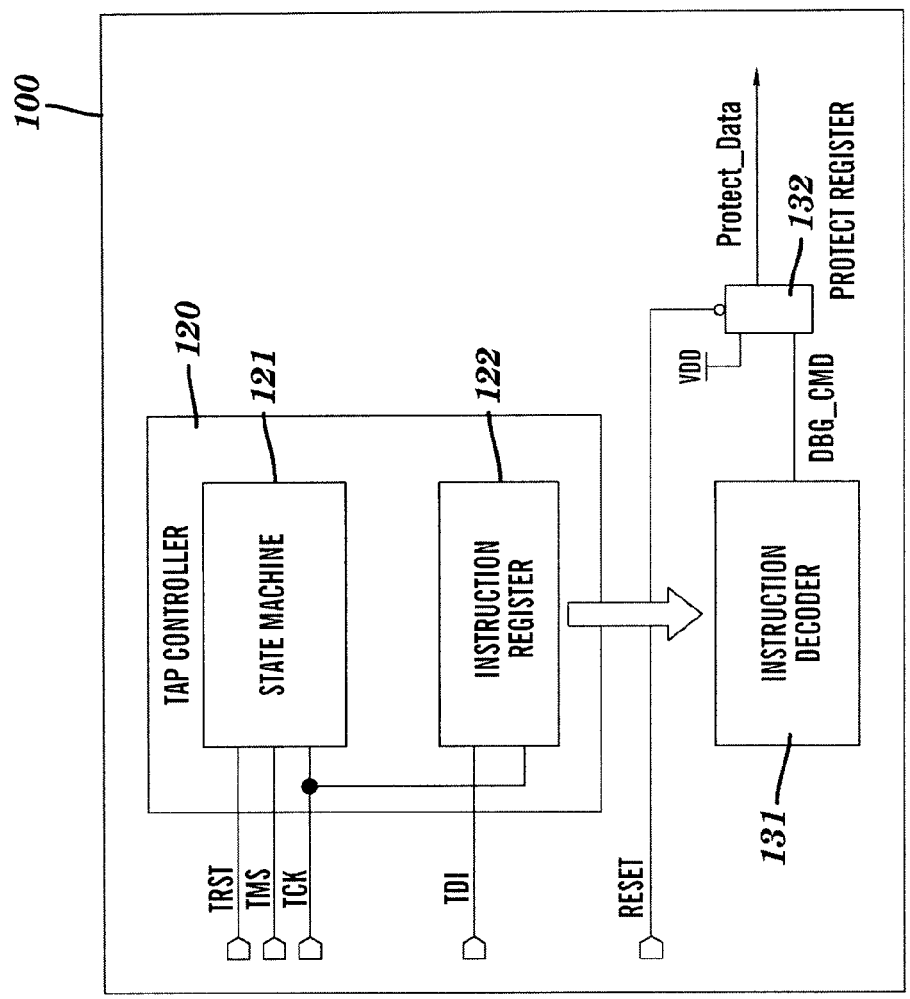
FIG. 3 is a drawing illustrating monitoring of an input instruction by TAP controller and instruction decoder according to the embodiment.

FIG. 3 is a drawing for illustrating monitoring of an input instruction by TAP controller 120 and instruction decoder 131.

As shown in FIG. 3, TAP controller 120 includes state machine 121 for JTAG and instruction register 122 for storing an input signal of TDI (Test Data Input) of JTAG.

Instruction decoder 131 decodes a content stored in instruction register 122 of TAP controller 120. Whether a private instruction for controlling a processor is executed in JTAG or not can be determined by monitoring a value in instruction register 122.

Specifically, if an instruction input into TAP controller 120 is a control instruction to processor 111, DBG_CMD signal, an output from instruction decoder 131 rises as "1".

Protect register 132 is initially cleared to "0" with a system reset signal (RESET). When DBG_CMD signal rises as "1", "1" is written into the protect register 132. As an input data of protect register 132 is connected to VDD (power supply voltage), protect register 132 is not cleared to "0" until a system reset signal is input, once it is set to "1".

Figure 4:
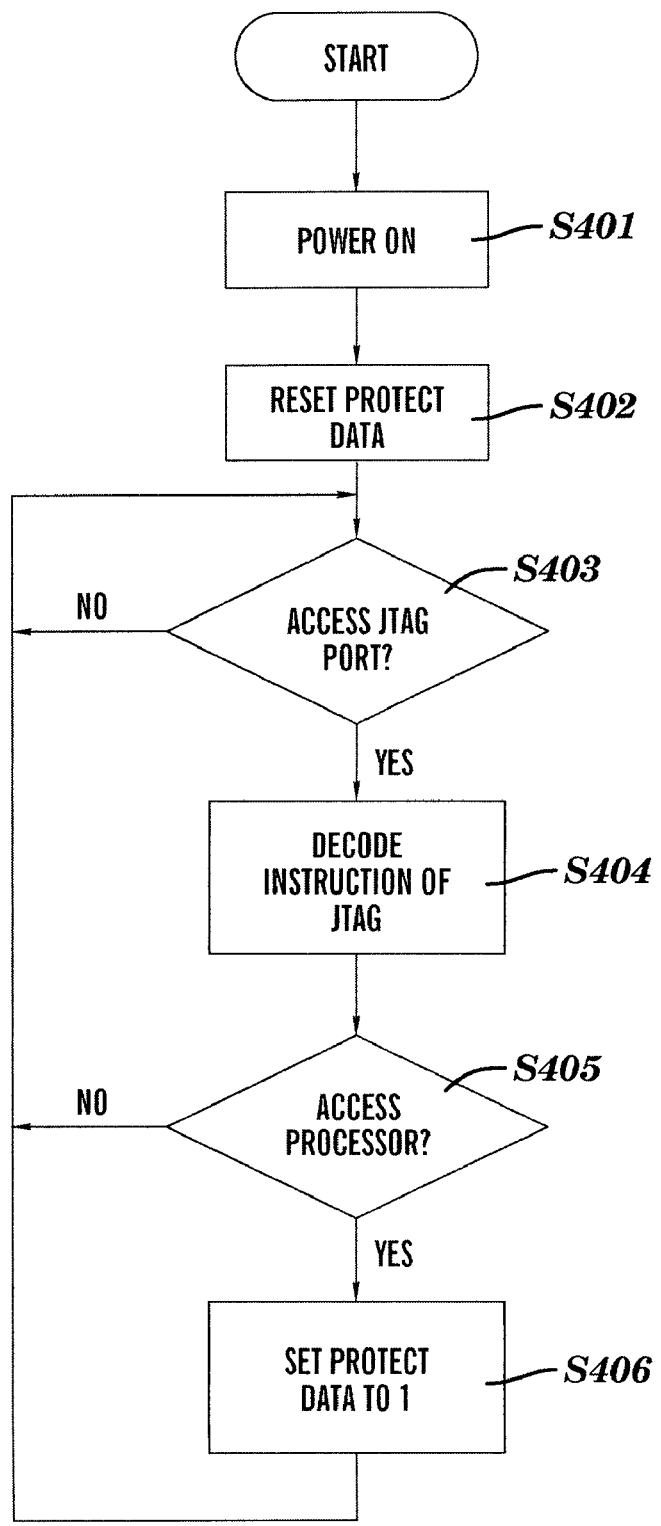
FIG. 4 is a flowchart for illustrating a flow of monitoring operations of a JTAG port in the embodiment.

FIG. 4 is a flowchart for illustrating a flow of monitoring operations of a JTAG port.

As shown in FIG. 4, an output signal from protect register 132 (hereinafter referred to as Protect_Data) is reset to 0 at an appropriate time such as when a system including SoC 100 is powered on (steps 401, 402). When it is accessed through a JTAG port, an input signal (instruction) stored in instruction register 122 of TAP controller 120 is decoded (steps 403, 404) at instruction decoder 131. If the decoded instruction is an access instruction to processor 111 (a control instruction to processor 111), protect data is set to 1 (steps 405, 406).

In this manner, when processor 111 accepts an input of a control instruction from outside via a debug port (JTAG port) and accesses memory from processor 111 according to this control instruction, this can be recognized by protect data.

When a value of protect data, which is an output signal from protect register 132, is "0" (i.e., in the normal operation), SoC 100 according to the embodiment does not start a memory protect operation provided in the embodiment. Therefore, processor 111 can freely access memory data in any memory area.

On the other hand, when a value of protect data is "1" (i.e., a control instruction to processor 111 such as a debug instruction is input to TDI), SoC 100 according to the embodiment starts a memory protect function provided in the embodiment and forbids processor 111 to access memory (ROM 113 and SRAM 114).

The abovementioned features "1. A processor can access all the memory areas in a general operation." and "2. The embodiment has a function of detecting that a debugger is connected to a JTAG port and controls the processor." are realized by using protect data as a flag and controlling an access to an address in a memory area protected in the embodiment as mentioned above.

Now, in accordance with the present invention, the manner in which data on memory in SoC 100 is protected with protect data, which is an output signal from protect register 132, will be described.

Figure 5:
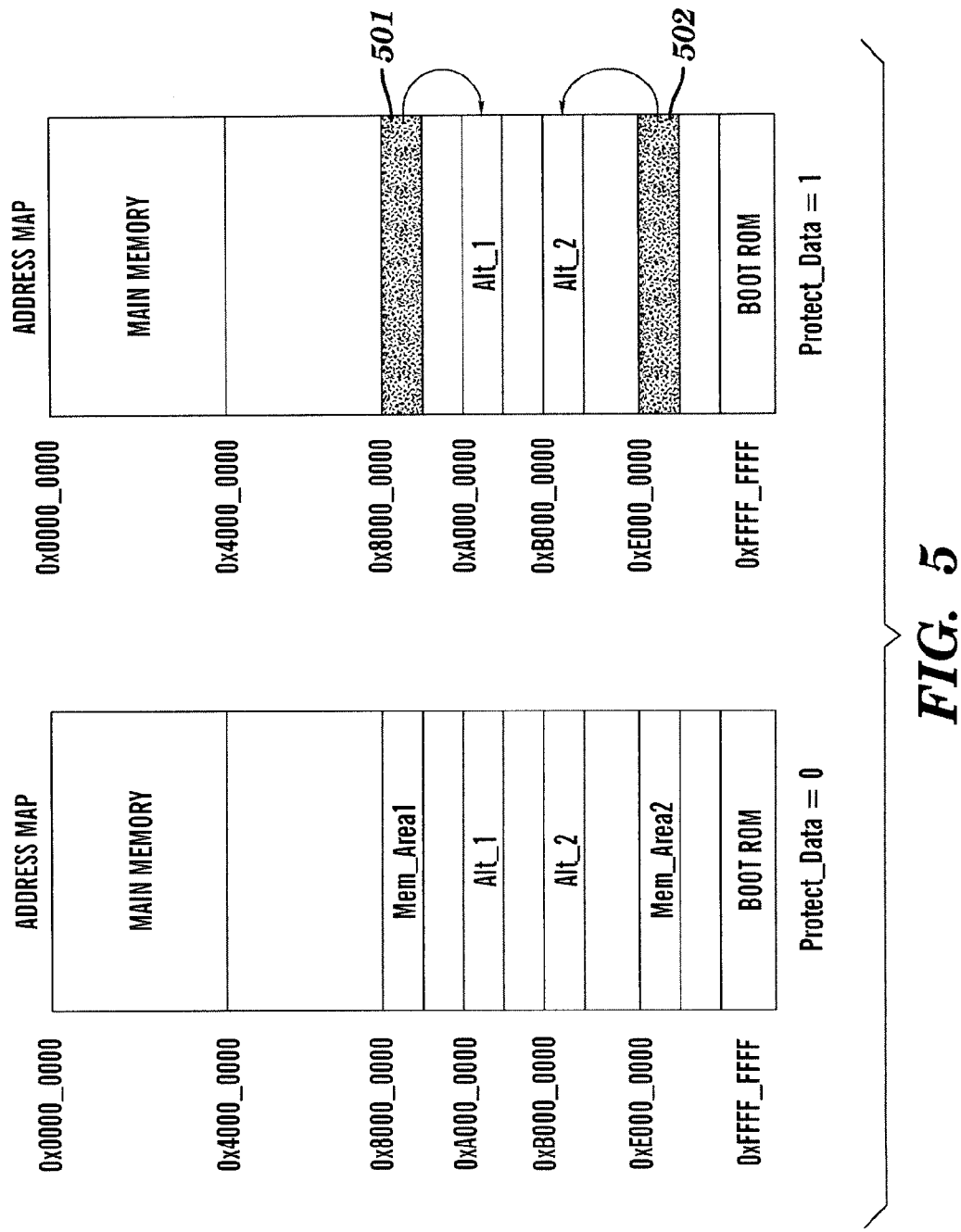
FIG. 5 is a drawing for illustrating a memory map in SoC.

FIG. 5 is a drawing for illustrating a memory map in SoC 100.

In FIG. 5, a grayed area 501, 502 is considered as a protected area 501, 502, i.e., an area forbidden to be accessed with a debugger. The area 501 includes the addresses from 0x8000_0000 to 0x807F_FFFF and the area 502 includes the addresses from 0xE000_0000 to 0xE03F_FFFF. In this example, it is assumed that the addresses 501 from 0x8000_0000 to 0x807F_FFFF are stored in SRAM 114, and the addresses 502 from 0xE000_0000 to 0xE03F_FFFF are stored in ROM 113 (see FIG. 1). Next, how the protected area of memory map shown in FIG. 5 is protected will be described, in accordance with the invention.

In SoC 100 shown in FIG. 1, inside register 141 stores the address of the memory area to be protected (Mem_Area1) and inside register 142 stores the address of the memory area to be protected (Mem_Area2). A bit length of an address stored in each of inside registers 141 and 142 represents a storage capacity of each memory to be protected. That is to say, if a bit length is 10 bits, the remaining 22 bits are an address signal for this memory, representing the storage capacity of 4-megabyte. Similarly, if a bit length is 8 bits, the remaining 24 bits are an address signal for this memory, representing the storage capacity of 16-megabyte. It is assumed that "1000_0000_0" is stored in inside register 141. The bit length is 9 bits, representing 8-megabyte for the address of the memory area 501 in SRAM 114, the addresses from 0x8000_0000 to 0x807F_FFFF. Similarly, it is assumed that "1110_0000_00" is stored in inside register 142. The bit length is 10 bits, representing 4-megabyte for the address of the memory area 502 in ROM 113, the addresses from 0xE000_0000 to 0xE03F_FFFF.

When processor 111 accesses data in memory, an address bus output from processor 111 is compared to the address stored in inside registers 141 and 142 at Compares 143 and 144. When the address bus is in the addresses stored in inside register 141 at Compare 143, i.e., when the high nine bits in the address bus is compared and found to be the same as the high nine bits in the address stored in inside register 141, Compare 143 outputs 1. Similarly, when the address bus is in the addresses stored in inside register 142 at Compare 144, i.e., when the high ten bits in the address bus is compared and found to be the same as the high ten bits in the address stored in inside register 142, Compare 144 outputs 1.

An output from two input adder 148 (hereinafter referred to as MASK_DATA) is 1 only when one of outputs from Compares 143 and 144 is 1 and protect data output from protect register 132 is 1. As mentioned above, protect data is 1 only when an instruction to control processor 111 is input into TAP controller 120 using JTAG port. If SoC 100 is generally used, the protect data is 0 and the mask data is not 1. Thus, the mask data is 1, only when a processor control instruction is input into TAP controller 120 of JTAG and processor 111 accesses a memory area whose data should be protected. In the example shown in FIG. 5, the mask data is 1 only when the addresses (501)from 0x8000_0000 to 0x807F_FFFF or (502) 0xE000_0000 to 0xE03F_FFFF are accessed.

Inside register 145 stores the address of a memory area of SRAM 202 in additional circuit block 200 (Alt_1). Inside register 146 stores the address of a memory area of ROM 201 in additional circuit block 200 (Alt_2). As the address stored in inside register 145 is nine bits and the address stored in inside register 146 is 10 bits, the tenth address data A (9) in an address bus of processor 111 is input in the address stored in inside register 145 to make the bit length to 10 bits as shown in FIG. 1.

Multiplexer 147 is Logic for switching inside registers 145 and 146, and inputs an output from Compare 144 as a switch signal. Specifically, when an output from Compare 144 is 1, the content stored in inside register 146 is selected; otherwise, the content stored in inside register 145 is selected.

Multiplexer 149 is Logic for switching an output from inside registers 141 and 142 and an output from inside registers 145 and 146. The abovementioned mask data is a switch signal of Multiplexer 149. When the mask data is 1, the high ten bits of an address bus output from processor 111 are replaced with address information stored in inside register 145 or inside register 146.

This switching operation will be specifically described.

It is assumed that "1000_0000_0" is stored in inside register 141. In inside register 141 shown in FIG. 1, the protected high address 0x800 is described. In inside register 145, the address to be replaced with 0x800, specifically "1010_0000_0" is stored. As mentioned above, as the bit length is nine bits, address data A (9) of an address bus of processor 111 is added to make ten bits.

It is assumed that "1110_0000_00" is stored in inside register 142. In inside register 142 shown in FIG. 1, the protected high address 0xE00 is described. In inside register 146, the address to be replaced with 0x800, specifically "1011_0000_00" is stored.

It is assumed that a debugger, such as RISCWatch™, is connected to a JTAG port of processor 111 and the protected data in memory is going to be read out in the above configuration.

A control instruction to the processor is input in processor 111 and TAP controller 120. At the same time, instruction decoder 131 detects an input of this control instruction, outputs DBG_CMD signal, and makes the protect data 1. Here, the case that the control instruction causes processor 111 to access protected data, specifically, to lead the address 0xE001_6800, for example, will be considered.

The high ten bits of this address ("1110_0000_00") is the same as the value stored in inside register 142. This makes an output from Compare 144 to be 1, accordingly the mask data, the output from two input adder 148 to be 1. Therefore, switching between Multiplexers 147 and 149 is performed and the value in inside register 146, "1011_0000_00", becomes the high ten bits of an address provided for bus interface unit 112. As a result, the address to be provided for bus interface unit 112, which is the destination address of an access by processor 111, is changed from the address 0xE001_6800 to the address 0xB001_6800.

Figure 6:
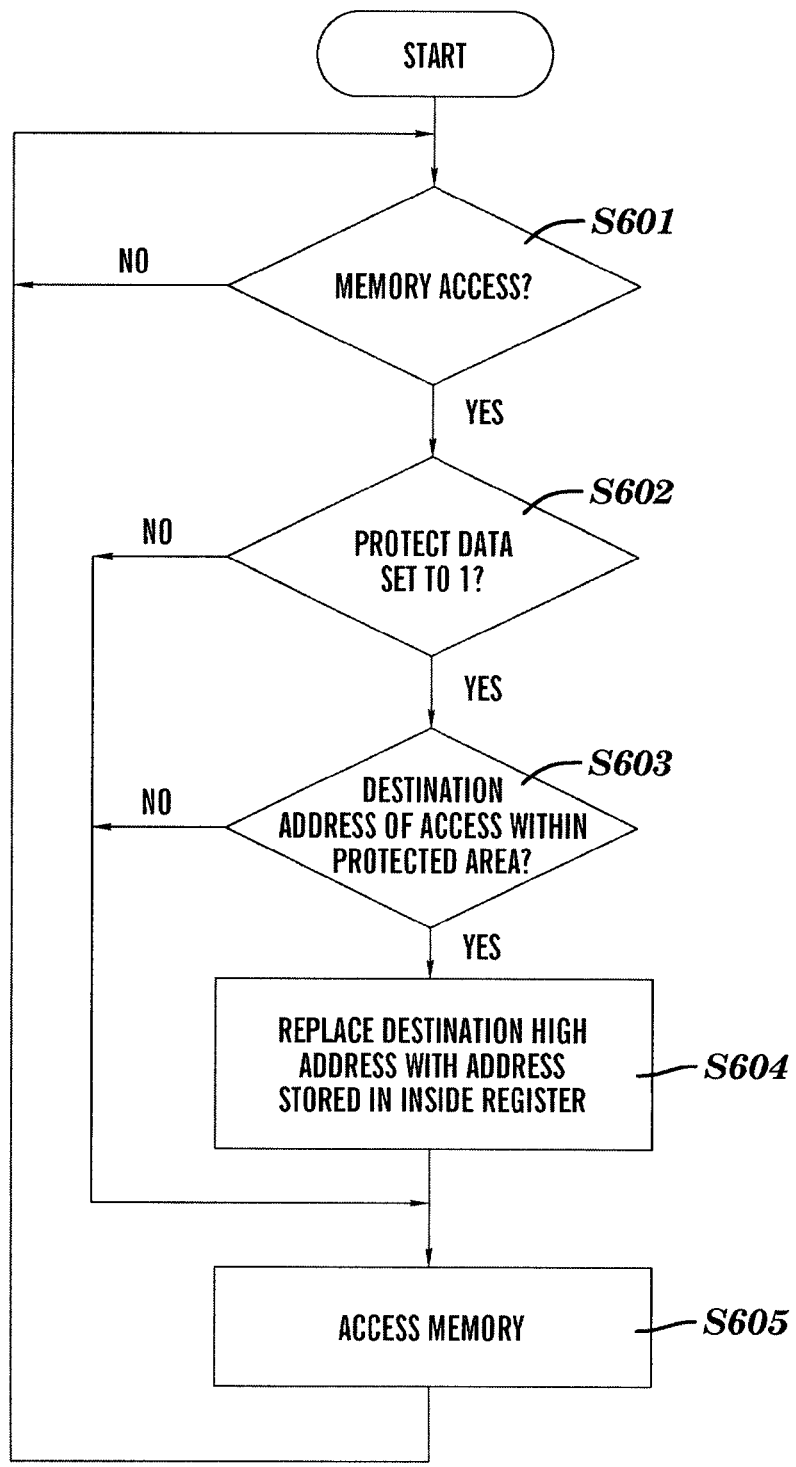
FIG. 6 is a flowchart illustrating a flow of operations of a memory protect function by the embodiment.

FIG. 6 is a flowchart illustrating a flow of operations of a memory protect function according to the embodiment.

If processor 111 accesses memory (ROM 113 or SRAM 114) during the operation of SoC 100 (Yes at step 601), protect data is set to 1 (Yes at step 602), and an destination address is within the protected area of memory (Yes at step 603), Multiplexer 149 replaces the high address to be accessed in an address bus with an address stored in inside registers 145 and 146 (step 604). Then the replaced address is accessed (step 605).

Multiplexer 147 determines which of addresses stored in inside registers 145 and 146 is used according to the results of comparison at Compares 143 and 144.

If protect data is 0 (No at step 602), or if an destination address for processor 111 is outside the protected area of memory (No at step 603), the replacement of address at step 604 is not performed and processor 111 accesses the destination address (step 605). This is because: When protect data is 0, it is not the access with a control instruction to processor 111 by a debugger, and thus, it does not need to forbid the protected area to be accessed. And when a destination address for processor 111 is outside the protected area, the access is not to the protected area, thus, the memory protection function according to the embodiment is not required to operate.

As the address within the memory area protected by the embodiment is compulsorily changed to another address in order to be accessed by a debugger, the address cannot be accessed.

In contrast, when a debugger is not connected to processor 111, the protect data remains 0 and replacement of an address as mentioned above is not performed. Therefore, the protected memory area in the embodiment can be accessed with an original function of processor 111.

By controlling an access to the protected area in memory as mentioned above, the abovementioned feature "3. The embodiment has means for forbidding an access to a memory area to be protected in memory, when a control on the processor by the debugger is detected." is realized.

In SoC 100 according to the embodiment, when a protected area in memory is accessed with a control instruction to processor 111 by a debugger as mentioned above, the destination address is compulsorily changed and the protected area cannot be accessed. However, in order to debug SoC 100 or to develop software, the content of the protected area in memory must be obtained by an access using a control instruction to processor 111 by a debugger. Then, the embodiment prepares additional circuit block 200 including ROM 201 and SRAM 202 storing the same storage content as that of ROM 113 and SRAM 114 in SoC 100.

Data written in ROM 113 and SRAM 114 in SoC 100 is known to developers. Thus, the developer can prepare such additional circuit block 200 to implement debugging or developing software.

When a debugger, such as IBM® RISCWatch™, is used for debugging SoC 100 or developing software, additional circuit block 200 is connected to SoC 100. As mentioned above, the storage content of ROM 201 and SRAM 202 of additional circuit block 200 is the same as the storage content of ROM 113 and SRAM 114 of SoC 100. Inside register 145 stores an address in memory area of ROM 201 (Alt_2) and inside register 146 stores an address in memory area of SRAM 202 (Alt_1). The memory protecting function according to the embodiment replaces the destination address accessed from processor 111 with an address of SRAM 202 or ROM 201 stored in inside registers 145 and 146.

Therefore, when a debugger accesses by using a control instruction to processor 111, the memory area corresponding to ROM 201 and SRAM 202 of additional circuit block 200 is accessed instead of the protected area of ROM 113 and SRAM 114 in SoC 100. Then processor 111 can read in data same as that stored in ROM 113 and SRAM 114.

This enables a program, which uses data stored in the protected area in memory, to be executed without any trouble in debugging or developing software. Thus, the abovementioned feature "4. The embodiment has means for realizing debugging and developing software, even if an access to a memory area to be protected within memory is forbidden." is realized.

In the abovementioned manner, the embodiment enables JTAG to execute debugging, while protecting the protected area by forbidding the access to the protected area in memory without fail even when SoC 100 is invaded from outside with debugger or the like. It is understood that the invention is not limited to the use of a particular debugger, and that the invention also can be applied to the access with a control instruction to processor 111 by a debugger other than the abovementioned RISCWatch™.

The embodiment can also monitor such an access to processor 111 via a debug port and execute the same operations for an access through a debug port other than JTAG, and forbid an access to a desired area in memory with a control instruction to processor 111 by a debugger.

In order to debug SoC 100, additional circuit block 200 is connected to SoC 100 and a debugger is used. Therefore, in order to access memory in SoC 100, SoC 100 changes the destination address of the access to the memory of additional circuit block 200 (ROM 201 and SRAM 202) so that SoC 100 can execute debugging while protecting the area forbidden to be accessed with a control instruction to processor 111 by a debugger without fail.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims. In particular, the described order of steps may be changed in certain circumstances or the functions provided by a different set of steps, and not depart from the scope of the invention.

What is claimed is:

1. A microcomputer, comprising:
   a first circuit block comprising:
      a processor comprising a first test access port (TAP) controller;
      a first memory;
      a second TAP controller;
      a means for providing an external input to said processor and said second TAP controller;
      a first monitoring means for monitoring said external input for detecting a debug instruction directed to said first and second TAP controllers; and
      a second monitoring means connected to said second TAP controller for determining whether said debug instruction comprises an access to a destination address that is within a predetermined protected area in said first memory;
   a second circuit block connected to said first circuit block, said second circuit block configured with a second memory for storing a copy of the contents of said predetermined protected area in said first memory; and
   an access control means for, if said first monitoring means has detected a debug instruction and said second monitoring means has detected that an access from said debug instruction is addressed to an address within said predetermined protected area, replacing the destination address of the access with a replacement address within said second memory in said second circuit block that contains said copy of said contents of said predetermined protected area in said first memory.

2. The microcomputer of claim 1 wherein said replacement address within said second memory in said second circuit block is stored in said first memory.

* * * * *